(No Model.)

C. H. HUXFORD.
COFFEE POT AND FILTER.

No. 519,020. Patented May 1, 1894.

Witnesses.
John F. Nelson
L. F. Longmore

Inventor
Charles H. Huxford

UNITED STATES PATENT OFFICE.

CHARLES H. HUXFORD, OF BROOKLYN, NEW YORK.

COFFEE POT AND FILTER.

SPECIFICATION forming part of Letters Patent No. 519,020, dated May 1, 1894.

Application filed December 19, 1892. Serial No. 455,721. (No model.)

*To all whom it may concern:*

Be it known that I, CHARLES H. HUXFORD, a citizen of the United States of America, and a resident of the city of Brooklyn, in the county of Kings and State of New York, have invented a certain new and useful Improvement in Filtering Sacks or Bags for Coffee-Pots, &c., of which the following is a full, clear, and exact description.

This invention consists of a filtering appliance for coffee and its combination with a coffee-pot, all substantially as hereinafter described.

Figure 1:
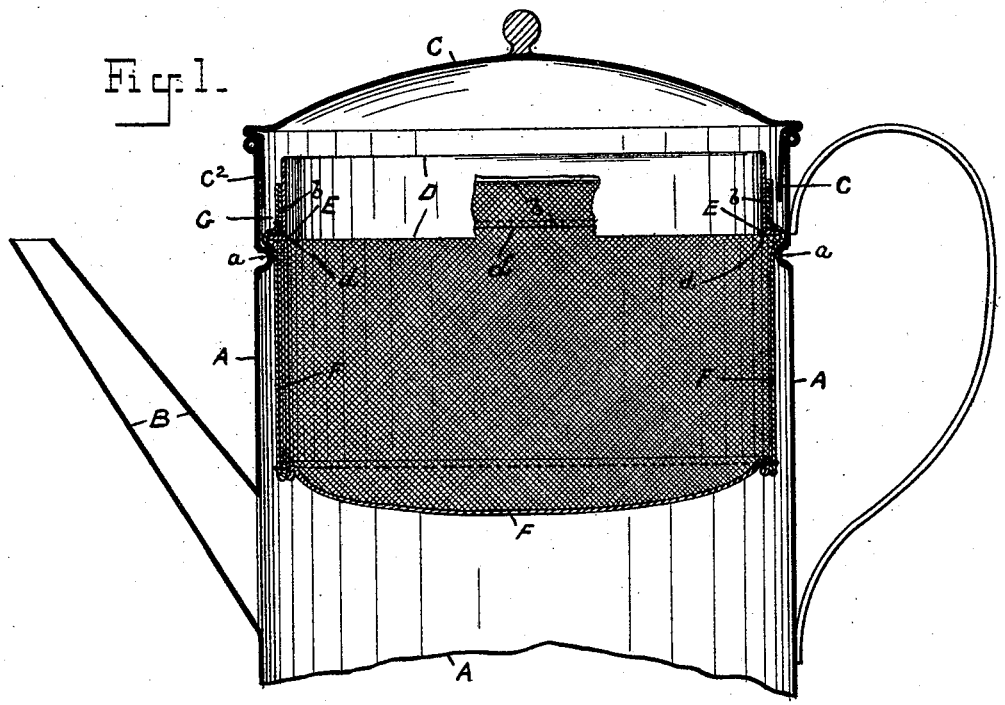
Figure 2:
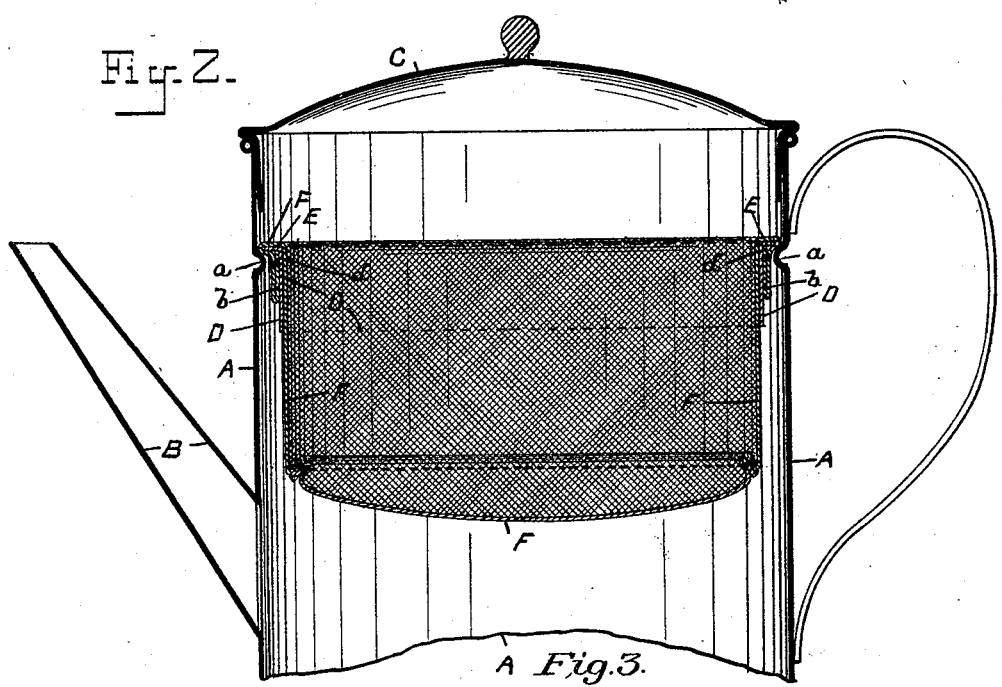
Figure 3:
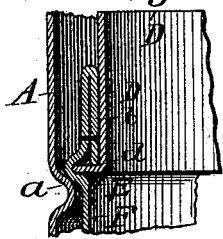

In the drawings, forming part of this specification, Figure 1 is a transverse, vertical and central section of the filtering appliance, placed and supported in a coffee-pot; shown also in similar section but only its upper portion. Fig. 2 is a similar view to Fig. 1, but varying from it as hereinafter appears. Fig. 3 is an enlarged section in detail.

In the drawings, A represents the coffee-pot.

B is the spout and C is the cover of the pot, all as usual and well known, and the pot, otherwise and as is common, has, for instance, an inward projecting bead $a$ entirely surrounding it, to serve as a rest for the filtering appliance of this invention, or other well known filtering appliances.

D is a ring or band of sheet metal, or of other suitable material, comparatively narrow in width, and of a diameter considerably less than that of the pot at its mouth or open end. This band D has a lateral and outward projecting and surrounding flange E, at one of its open ends. This band D is of a diameter suitable, when it is placed in, to rest on the inside bead $a$, of the pot.

F is a filtering sack or bag made of cloth, or other material suitable for the filtering purpose for which it is to be used, as for instance, when to be used for leaching and filtering coffee of coarse unbleached cotton cloth. This bag, at its open end, is of a diameter, substantially such as to fit, preferably closely, the band, on its outer side, and the bag, by its open end, is placed on the flanged end of the band by pulling or drawing it over said flange and onto and about the outer side of the band beyond said flange. By the relative construction of the band and of the mouth of the filtering-sack, and by the attachment of the two, all substantially as explained, the flange draws outwardly on the sack and engages, or in other words, interlocks, as it were, it and the band, with the sack, and thereby secures a strong and reliable attachment of the sack to the band. So attached the sack depends from the flanged end of the band, Fig. 1, and the attachment is such as to practically resist any accidental detachment of it from the band, in the practical and proper use of the appliance for filtering, as wished.

If desired, Fig. 2, the pendent sack may be pushed through the metal band at its flanged end and thus made to line the inner side of the band, and all without affecting in any material or practical degree, the hold or bite as it were, of the flange on the sack.

Preferably, the open mouth of the bag has an inside stitched hem $b$, which, with the bag on the band, preferably, is in contact with the outer side of the band, and all for the reason, that the exposed edge $d$ of the hem at rest on the flange of the band efficiently aids in the security of the attachment of the bag to the band as above explained.

The filtering sack used in a coffee-pot preferably depends from the flanged end of the band, Fig. 1, although as in Fig. 2, it may depend from the opposite end of the band. The sack depending as shown, Fig. 1, gives a greater depth of sack as compared with that when the sack depends as in Fig. 2, and further Fig. 1, a space G is left about the band, and the band may extend in height practically to the top of the pot, thus giving increased capacity to the appliance for coffee. The space G about the band is convenient to receive the flange $C^2$ of the cover. Again the flange of the band preferably is of a diameter to closely fit the inside of the coffee pot.

Having thus described my invention, what I claim, and desire to secure by Letters Patent, is—

A filtering appliance for coffee pots &c., composed of a band or ring having an outward projecting flange and an outer bearing face above said flange, and of a filtering bag having a mouth fitting over said outer bearing face and engaging said flange of said ring, in combination with the flange $a$ of the pot, substantially as described, for the purposes specified.

CHARLES H. HUXFORD.

Witnesses:
K. DURFEE,
O. M. SHAW.